March 26, 1929.  O. G. ANDERSON  1,706,990
OIL TRAP
Filed June 25, 1926
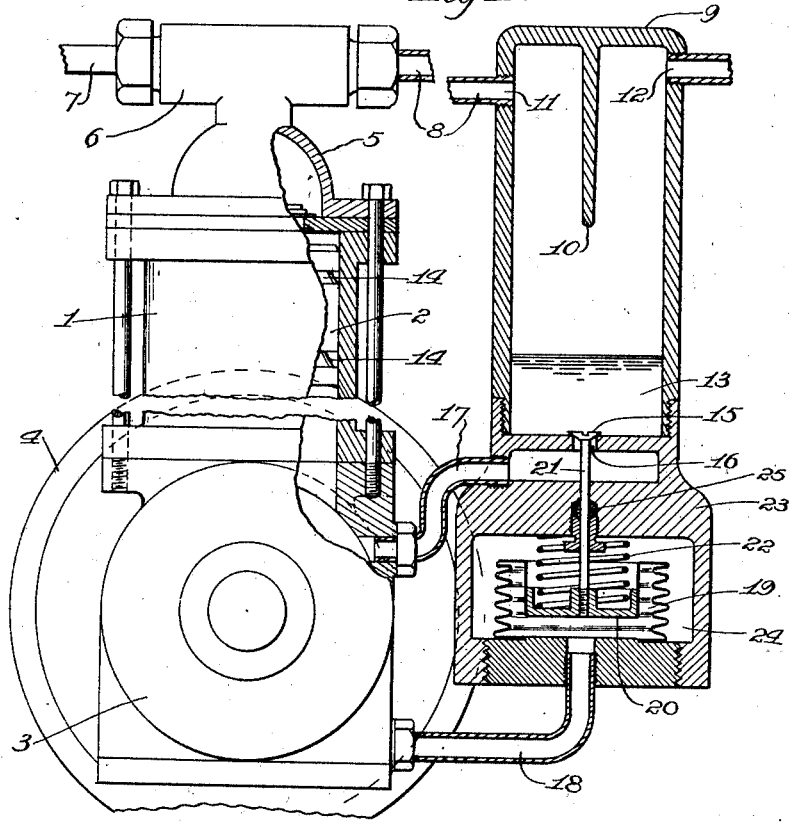
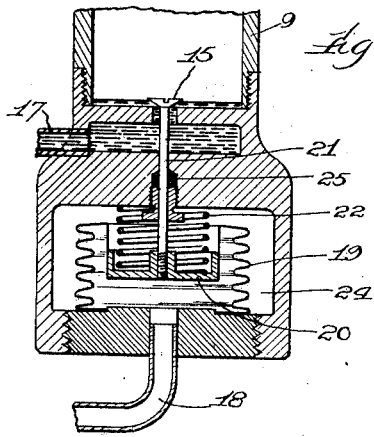
Inventor:
Oscar G. Anderson.
by his Attorneys.
Witness Patented Mar. 26, 1929.

1,706,990

UNITED STATES PATENT OFFICE.

OSCAR G. ANDERSON, OF MARQUETTE, MICHIGAN.

OIL TRAP.

Application filed June 25, 1926. Serial No. 118,471.

The purpose of this invention is to provide improved means for separating lubricating oil employed in a gas or vapor compressing machine from the gas or vapor handled by the machine. It consists in certain features and elements of construction in combination, as herein shown and described, and as indicated by the claims.

In the drawings:

Figure 1 is a side elevation of a compressor shown partly in section and having connected therewith an oil trap embodying this invention and shown wholly in vertical axial section.

Figure 2 is a sectional view similar to Fig. 1, showing the lower portion of the oil trap during the process of emptying.

For purposes of illustration and description this invention may be understood as applied to the compressing unit of a refrigerating system. Such a compressor is conventionally shown as having a cylinder, 1, provided with a piston, 2, crank case, 3, and fly wheel, 4. Attached to the head, 5, of the cylinder, 1, is a valve fitting, 6, which may be understood as containing inlet and outlet valves communicating respectively with the inlet pipe, 7, and outlet pipe, 8. The refrigerant used in the system comes to the compressor through the pipe, 7, in the form of a gas and is compressed and delivered through the outlet pipe, 8. Unavoidably a certain portion of the lubricating oil employed in the machine becomes admixed with the gas leaving through the outlet, 8, and it is desirable to recover this oil from the gas both for the sake of economy in lubrication cost and to avoid trouble in the system which might arise from the presence of the oil, particularly when the refrigerant reaches such low temperatures as might cause the lubricant to congeal and gum other working parts of the cooking apparatus.

To accomplish the separation of the oil I lead the compressed gas from the outlet, 8, through a trapping chamber, 9, having a depending baffle wall, 10, disposed between the inlet port, 11, of the chamber and the outlet port, 12, both of these being located in the upper portion of the chamber. This baffle wall causes the gas which enters at the inlet, 11, to suddenly change its direction of flow, and as the gas impinges against the baffle, 10, the oil vapor which it carries tends to condense upon the baffle wall and drip off the lower edge thereof while the gas itself fills the chamber, 9, and escapes through the outlet, 12. The oil dripping from the baffle, 10, accumulates in a pool, 13, in the lower portion of the chamber, 9. While the compressor is running the pressure in the cylinder, 1, is normally higher than that in the crank case, 3, but in practically all refrigerating systems the operation of the compressor is intermittent and when the piston, 2, stops moving the gas which is trapped under pressure above the piston in the system tends to absorb heat and expand and then leak past the sealing rings, 14, raising the pressure in the crank case, 3. Thus during the period of suspended operation the crank case pressure is practically certain to rise to a value higher than atmospheric pressure.

In the bottom of the trapping chamber, 9, a normally closed valve, 15, controls a port, 16, which leads by way of a passage, 17, into the crank case, 3. Another passage, 18, provides communication between the crank case, 3, and the interior of an expansible chamber or bellows, 19, of the corrugated metal type, and the upper wall, 20, of this chamber is positively connected to the stem, 21, of the valve, 15. Thus the increase of pressure in the crank case, 3, tends to cause expansion of the bellows, 19, lifting the valve, 15, from its seat and allowing the accumulation of oil at 13, to flow through the port, 16, and passage, 17, back into the crank case. A spring, 22, reacting against the top wall 20, of the bellows seats the valve, 15, with a predetermined pressure which of course must be overcome by the crank case pressure before the bellows, 19, will expand to open the valve.

As a convenient construction, the base of the chamber, 9, is formed as a casting, 23, providing a space, 24, vented to the atmosphere, for housing the bellows, 19, and packing is inserted at 25 around the stem, 21, of the valve, 15, to prevent leakage of oil into the space, 24.

I claim:—

1. An oil separator for a gas-compressor of the piston and cylinder type, comprising a delivery conduit leading from the cylinder of the compressor, an oil trapping chamber having in its upper portion an inlet port and an outlet port for gas, the inlet being connected to said delivery conduit, a baffle wall in the chamber between the inlet and the outlet arranged with a space below the baffle to receive oil dripping therefrom, a passage leading from said space to the crank case of the compressor, a normally closed valve controlling said passage and pressure responsive means connected for opening said valve upon increase of pressure in said crank case.

2. An oil separator for a gas-compressor of the piston and cylinder type, comprising a delivery conduit leading from the cylinder of the compressor, an oil trapping chamber having in its upper portion an inlet port and an outlet port for gas, the inlet being connected to said delivery conduit, a baffle wall in the chamber between the inlet and the outlet arranged with a space below the baffle to receive oil dripping therefrom, a passage leading from said space to the crank case of the compressor, a valve controlling said passage, and means for automatically opening said valve during the idle periods of operation of the compressor.

3. An oil separator for a gas-compressor of the piston and cylinder type, comprising a delivery conduit leading from the cylinder of the compressor, an oil trapping chamber having in its upper portion an inlet port and an outlet port for gas, the inlet being connected to said delivery conduit, a baffle wall in the chamber between the inlet and the outlet arranged with a space below the baffle to receive oil dripping therefrom, a passage leading from said space to the crank case of the compressor, a valve controlling said passage, an expansible chamber subjected exteriorly to atmospheric pressure and interiorly connected with the crank case, said chamber being connected with the valve for actuating the same when pressure in the crank case expands the chamber.

4. In the combination defined in claim 3, a spring disposed for normally seating the valve.

5. An oil separator for a gas-compressor of the piston and cylinder type, comprising a delivery conduit leading from the cylinder of the compressor, an oil trapping chamber having in its upper portion an inlet port and an outlet port for gas, the inlet being connected to said delivery conduit, a baffle wall in the chamber between the inlet and the outlet arranged with a space below the baffle to receive oil dripping therefrom, a receiving chamber below said space, a port affording communication between the two chambers, a normally closed valve at said port having a stem passing through the receiving chamber and its opposite wall with means for packing said stem; and mechanism outside the receiving chamber responsive to pressure in the crank case of the compressor and connected for opening the valve upon increase of said pressure.

6. In the combination defined in claim 3, said expansible chamber having a pressure actuating area several times greater than that of said valve, whereby said valve is caused to be actuated when the pressure in the crank case is less than the pressure in the oil trapping chamber.

7. In the combination defined in claim 3, said expansible chamber having a pressure actuating area greater than that of said valve, and a spring co-operating with said expansible chamber whereby to permit actuation of said valve only when the pressure in the crank case has reached a predetermined amount.

In testimony whereof, I have hereunto set my hand at Chicago, Illinois, this 4th day of June, 1926.

OSCAR G. ANDERSON.